United States Patent [19]
Moses

[11] 4,298,663
[45] * Nov. 3, 1981

[54] PREDISCHARGED NONAQUEOUS CELL

[75] Inventor: Peter R. Moses, Windham, N.H.

[73] Assignee: Duracell International Inc., Bethel, Conn.

[ * ] Notice: The portion of the term of this patent subsequent to Apr. 28, 1998, has been disclaimed.

[21] Appl. No.: 91,149

[22] Filed: Nov. 5, 1979

Related U.S. Application Data

[63] Continuation-in-part of Ser. No. 80,891, Oct. 1, 1979, Pat. No. 4,264,689.

[51] Int. Cl.$^3$ ............................................. H01M 6/16
[52] U.S. Cl. ..................................... 429/50; 429/194; 29/623.1
[58] Field of Search ................. 429/50, 194, 195, 224, 429/197; 29/623.1

[56] References Cited

U.S. PATENT DOCUMENTS

| | | | |
|---|---|---|---|
| 4,133,856 | 1/1979 | Ikeda et al. | 429/224 |
| 4,160,070 | 7/1979 | Margalit et al. | 429/194 |
| 4,163,829 | 8/1979 | Kronenberg | 429/194 |
| 4,184,017 | 1/1980 | Kelsey et al. | 429/197 |

Primary Examiner—Donald L. Walton
Attorney, Agent, or Firm—Ronald S. Cornell; Israel Nissenbaum; Martin M. Glazer

[57] ABSTRACT

An electrochemical cell containing a decomposing electrolyte solvent, further contains small amounts of an additive material such as lithium sulfide which causes partial self discharge of the cathode of the cell with non-reactive products. The self discharge partially deactivates substantially all of the active cathode surface as a reaction site thereby reducing the decomposition of the electrolyte solvent.

24 Claims, No Drawings

PREDISCHARGED NONAQUEOUS CELL

This is a continuation-in-part of U.S. patent application Ser. No. 80,891 filed on Oct. 1, 1979 now U.S. Pat. No. 4,268,689.

This invention relates to nonaqueous electrolyte cells, particularly those containing decomposing electrolyte solvents and more particularly those also containing beta-manganese dioxide cathodes.

Nonaqueous electrolyte cells generally require the stringent exclusion of water which is usually accomplished by rigorous heating and drying procedures. Such procedures are required since it is believed that retained water detrimentally reacts with the active metal (metals above hydrogen in the EMF series) anodes, such as lithium, used in such cells with resultant gas evolution. The problem of retained water is particularly exacerbated in cells containing cathodes such as metal oxides which are generally hygroscopic in nature and tenaciously retain absorbed or adsorbed water. Thus, for example, manganese dioxide utilized in the substantially beta form as the active cathode material in nonaqueous cells requires rigorous heat treatment (200° C. or higher when formed into cathodes with binders) to drive off retained water (see U.S. Pat. No. 4,133,856). Without such heat treatment such cells are dimensionally unstable and have reduced electrochemical capabilities. In copending application Ser. No. 70,198 I disclosed that in small amounts, water retained in a cell, particularly in a cathode, does not in fact detrimentally react with the active metal anode but rather initiates a reaction between certain commonly used electrolyte salts and solvents. This reaction leads to decomposition of the solvents such as propylene carbonate with resultant evolution of gaseous reaction products (presumably $CO_2$ in the case of propylene carbonate) which detrimentally affect cell stability and capacity. In parent application Ser. No. 80,891, now U.S. Pat. No. 4,264,689 I disclosed that such reaction could be minimized with lesser heating or even without heating by partially deactivating substantially all of the active cathode surface. Without a site for the reaction of electrolyte salt and solvent the decomposition of the solvent is thereby minimized with resultant increased cell stability. In order to provide such deactivation it was specifically disclosed that an additive such as $LiNO_3$, particularly when mixed with the cathode active materials prior to formation of the cathode, would thereafter react with active surface members on the cathode and reduce them to less active states. The cathode as deactivated would then be assembled into a cell.

It is an object of the present invention to provide additives for use within an electrochemical cell which partially deactivate substantially all of the active cathode surface after the cell is assembled and prior to initial cell discharge.

It is a further object of the present invention to provide an electrochemical cell having additives therein which self discharge the cathode thereof to a limited extent to partially deactivate substantially all of the active cathode surface.

It is a still further object of the present invention to provide a nonaqueous cell which does not require rigorous heat treatment to drive off retained water therefrom.

These and other objects, features and advantages will become more evident from the following discussion.

Generally the present invention comprises the inclusion of an additive within an electrochemical cell which self discharges the cathode to a limited extent whereby partial deactivation of substantially all of the active cathode surface takes place. With such self discharge and deactivation, decomposable electrolyte solvents such as propylene carbonate are substantially prevented from such decomposition even in the presence of small amounts of water and detrimental gaseous evolution is likewise minimized. Rigorous heat treatment of the cathode is therefore obviated. Elimination or reduction of the cathode heat treatment step provides an additional benefit whereby tarnishing of the cell containers, made of stainless steel, caused by such heating step is likewise reduced. With the reduction of tarnishing and though stainless steel provides greater mechanical strength, the use of aluminum for containers is preferred because of greater conductivity, lower cost and lightness.

The additives of the present invention, in order to provide the requisite deactivation of substantially all of the active cathode surface, must be in intimate contact with such surface. In order to provide such intimate contact it is generally necessary that the additive be at least partially soluble in the electrolyte solvent. It is a further criterion of the additive that reaction products or products of the chemically induced cathode self discharge be substantially unreactive within the cell whereby once the cathode surface is deactivated thereby with consumption of the additive, further reaction does not continue thereby unnecessarily reducing cell capacity. In order to provide the requisite cathode self discharge but without unduly reducing cell capacity it is preferred that the amount of the additive be of a magnitude whereby no more than 5% of the capacity of the cathode is discharged thereby. When the additive has a partial but low solubility in the electrolyte solvent it is preferred that the additive be introduced within the cell as an admixture with the active cathode material. The partial solubility of the additive thereafter provides full cathode surface contact via the fluid electrolyte solution when the cell is assembled. Alternatively, with more soluble additives, they may be introduced into the cell as a solvated species in the electrolyte solvent.

An example of a particularly effective additive even when used in small amounts is lithium sulfide. Other additives include alkali and alkali earth metal sufides, selenides, tellurides such as $Na_2S$, $K_2S$, $MgS$, $CaS$, $Li_2Se$, $Na_2Se$, $K_2Se$, $MgSe$, $CaSe$, $Li_2Te$, $Na_2Te$, $K_2Te$, $MgTe$, and $CaTe$ and generally inorganic or organic materials which fulfill the criteria of (a) reaction with the active cathode surface to discharge said surface, (b) at least partial solubility in the electrolyte solvent whereby intimate contact with the active cathode surface is possible and (c) reaction products with the cathode which are substantially unreactive in the cell whereby the discharge reaction ceases once the additive is consumed.

The additives of the present invention are of particular utility in cells having active metal anodes such as lithium, sodium, potassium, magnesium, calcium and aluminum as anodes since such active metals are generally utilized in cells containing nonaqueous electrolytes which are particularly susceptible to decomposition and gaseous evolution.

Examples of active cathode materials which are particularly susceptible to water retention include metal oxides such as the aforementioned beta manganese dioxide, $TiO_2$, $SnO_2$, $MoO_3$, $V_2O_5$, $CrO_3$, PbO, $Fe_2O_3$ and generally transition metal oxides. Though metal oxides have been enumerated as cathode materials, the present invention is equally applicable to cells containing other cathode materials in which water retention and solvent decomposition present problems.

Nonaqueous electrolyte solvents which are subject to decomposition with gaseous evolution include propylene carbonate and dimethoxyethane, (PC and DME) (commonly used as solvents in cells containing beta-manganese dioxide cathodes) and dimethyl sulfoxide.

In order to more fully illustrate the efficacy of the present invention the following examples are presented. Since the examples are for illustrative purposes details therein should not be construed as limitations on the present invention. Unless otherwise indicated all parts are parts by weight.

EXAMPLE 1 (PRIOR ART)

Nine hundred milligrams of gamma-electrolytic manganese dioxide (EMD) are heated to 375° C. for three hours. The gamma-EMD is converted to beta-$MnO_2$ which is then mixed with 60 milligrams of graphite, as conductive diluent, and 40 milligrams of a polytetrafluoroethylene (PTFE) dispersion, as binder. The mixture is formed into a pellet (about 1" (2.54 cm) diameter) and heated to 300° C. under a vacuum for 6 hours. The cathode pellet is then assembled into a flat wafer cell (0.100" (0.254 cm) height by 1" (2.54 cm) diameter) with a lithium foil disc (700 mg) anode, a non-woven polypropylene separator and an electrolyte solution of about 275 mg 1 M $LiClO_4$ in an equivolume mixture of PC/DME. The completed cell is heated to 115° C. for one hour and cooled to room temperature with an expansion of about 0.005 inch (0.0127 cm).

A second cell made in an identical manner provides an average open circuit voltage (OCV) of about 3.60 volts over a period of 2 months when stored at room temperature. The capacity of a similar cell stored at 50° C. for 60 days when discharged at 1 mA is about 218 mAhr.

EXAMPLE 2 (MODIFIED PRIOR ART)

A cell is made in accordance with the procedure in Example 1 but after the cathode pellet is formed it is heated to 150° C. for 6 hours rather than 300° C. The cell is heated to 115° C. for one hour and cooled to room temperature with an expansion of about 0.030 inches (0.0762 cm).

EXAMPLE 3

A cell is made as in Example 2 but with 0.5% (25 mg) $Li_2S$ mixed into the cathode before the pelletizing step. The completed cell is heated to 115° C. for one hour and then cooled to room temperature with an expansion of about 0.005 inch (0.0127 cm). A second cell made in an identical manner provides an average OCV of about 3.32 volts over a period of 2 months when stored at room temperature. The capacity of a similar cell stored at 50° C. for 60 days is about 215 mAhr when discharged at 1 mA.

EXAMPLE 4

A cell is made in accordance with Example 3 but with 1% (~10 mg) $Li_2S$ in the cathode. The completed cell is heated to 115° C. for one hour and then cooled to room temperature with an expansion of about 0.003 inch (0.00762 cm). A second cell made in an identical manner provides an average OCV of about 3.10 volts over a period of 2 months when stored at room temperature. The capacity of a similar cell (stored for 60 days at 50° C.) is about 212 mAhr when discharged at 1 mA.

EXAMPLE 5

A cell is made as in Example 3 but with 2% (~20 mg) of $Li_2S$ in the cathode. The completed cell is heated to 115° C. for one hour and then cooled to room temperature with an expansion of about 0.003 inch (0.00762 cm). The capacity of a similar cell (stored for 60 days at 50° C.) is about 200 mAhr when discharged at 1 mA.

EXAMPLES 6-13

Four cells are made as in Example 1 but with heat treatment of the pelletized cathode being at 25°, 150°, 225° and 300° C. respectively. Four additional cells are made as in Example 3 but with the heat treatment of the pelletized cathode being at 25°, 150°, 225° and 300° C. respectively. All the cells are thereafter heated to 115° C. for one hour and cooled to room temperature. The expansion of the cells under the cited conditions is summarized in the following table.

TABLE

| Cell and Example # | Pellet Treatment Temperature (°C.) | % $Li_2S$ in Cathode | % Cell Expansion (Heated to 115° C. 1 hr-cooled room temp. |
|---|---|---|---|
| 6 | 25 | 0.0 | 37 |
| 7 | 150 | 0.0 | 33 |
| 8 | 225 | 0.0 | 25 |
| 9 | 300 | 0.0 | 6 |
| 10 | 25 | 0.5 | 17 |
| 11 | 150 | 0.5 | 4 |
| 12 | 225 | 0.5 | 3 |
| 13 | 300 | 0.5 | 3 |

From the above examples it is clearly evident that by the addition of small amounts of the additives of the present invention cell stability is enhanced without the necessity for costly heating. The minimally lowered energy density caused by the additive in fact may be beneficial since as indicated in Examples 3 and 4 the OCV is lowered and to which the loss in energy density may be attributed. The high OCV (about 3.6 volts) and high initial voltages may be detrimental to electrical equipment presently adapted to be operable at the standard alkaline cell voltage of about 3 volts (2 cells in series). The additives of the present invention therefore provide a means whereby the high initial voltages of the cells may be reduced or suppressed which enables such cells to be used in existing equipment initially adapted to the lower voltages.

It is understood that the above examples are for illustrative purposes and enumeration of specific details contained therein should not be construed as limitations on the present invention as defined in the following claims.

What is claimed is:

1. A method of stabilizing an electrochemical cell having an active metal anode, a solid active cathode and a nonaqueous electrolyte, said method comprising the step of placing a cathode discharging additive within said cell, said additive being at least partially soluble in said electrolyte and in sufficient quantity to self discharge substantially all of the surface of said active cathode prior to initial discharge of said cell, wherein reaction products of said self discharge are substantially non-reactive within said cell and wherein said additive is placed within said cell by dissolving said additive in said nonaqueous electrolyte.

2. The method of claim 1 wherein said quantity of said additive is of a magnitude whereby no more than 5% of the capacity of said active cathode is self discharged thereby.

3. The method of claim 1 wherein said active cathode is comprised of a member of the group consisting of beta-$MnO_2$, $TiO_2$, SnO, $MoO_3$, $V_2O_5$, $CrO_3$, PbO and $Fe_2O_3$.

4. The method of claim 3 wherein said active cathode comprises beta-$MnO_2$.

5. The method of claim 4 wherein said nonaqueous electrolyte is comprised of a member of the group consisting of propylene carbonate, dimethoxyethane and mixtures thereof.

6. The method of claim 5 wherein said nonaqueous electrolyte further includes an electrolyte salt comprised of $LiClO_4$.

7. A method of stabilizing an electrochemical cell having an active metal anode, a solid active cathode and a nonaqueous electrolyte, said method comprising the step of placing a cathode discharging additive within said cell, said additive being at least partially soluble in said electrolyte and in sufficient quantity to self discharge substantially all of the surface of said active cathode prior to initial discharge of said cell, wherein reaction products of said self discharge are substantially non-reactive within said cell and wherein said additive comprises a member selected from the group comsisting of $Li_2S$, $Na_2S$, $K_2S$, MgS, CaS, $Li_2Se$, $Na_2Se$, $K_2Se$, MgSe, CaSe, $Li_2Te$, $Na_2Te$, $K_2Te$, MgTe and CaTe.

8. The method of claim 7 wherein said additive is placed within said cell by mixing said additive with said solid active cathode.

9. The method of claim 8 wherein said quantity of additive is 2% or less of the weight of said active cathode.

10. The method of claim 9 wherein said quantity of additive is 0.5% or less of the weight of said active cathode.

11. The method of claim 7 wherein said additive comprises $Li_2S$.

12. A method of stabilizing an electrochemical cell having a lithium anode, a beta-$MnO_2$ cathode and a nonaqueous electrolyte comprising the step of mixing an additive selected from the group consisting of $Li_2S$, $Na_2S$, $K_2S$, MgS, CaS, $Li_2Se$, $Na_2Se$, $K_2Se$, MgSe, CaSe, $Li_2Te$, $Na_2Te$, $K_2Te$, MgTe and CaTe with said beta-$MnO_2$, said additive being of sufficient quantity to self discharge substantially all of the surface area of said beta-$MnO_2$ but less than sufficient to self discharge more than 5% of the capacity of said beta-$MnO_2$.

13. The method of claim 12 wherein said additive comprises $Li_2S$.

14. The method of claim 13 wherein said quantity is 0.5% or less of the weight of said beta-$MnO_2$.

15. The method of claim 14 wherein said nonaqueous electrolyte comprises a member of the group consisting of propylene carbonate, dimethoxyethane and mixtures thereof.

16. The method of claim 15 wherein said nonaqueous electrolyte further includes an electrolyte salt comprised of $LiClO_4$.

17. A cell made in accordance with the method of claim 14.

18. A cell as in claim 17 wherein said cell is contained within a container comprised of aluminum.

19. A cell made in accordance with the method of claim 13.

20. A cell made in accordance with the method of claim 12.

21. A method of lowering the open circuit voltage of an electrochemical cell comprising a lithium anode, a beta-$MnO_2$ cathode and a nonaqueous electrolyte said method comprising the step of dissolving an additive said electrolyte said cell which additive partially self discharges said beta-$MnO_2$, prior to initial cell discharge.

22. A method of lowering the open circuit-voltage of an electrochemical cell comprising a lithium anode, a beta-$MnO_2$ cathode and a nonaqueous electrolyte said method comprising the step of placing an additive comprised of a member selected from the group consisting of $Li_2S$, $Na_2S$, $K_2S$, MgS, CaS, $Li_2Se$, $Na_2Se$, $K_2Se$, MgSe, CaSe, $Li_2Te$, $Na_2Te$, $K_2Te$, MgTe, and CaTe, within said cell which additive partially self discharges said beta-$MnO_2$, prior to initial cell discharge.

23. The method of claim 22 wherein said additive comprises $Li_2S$.

24. The method of claim 23 wherein said $Li_2S$ does not self discharge more than 5% of the capacity of said beta-$MnO_2$.

* * * * *